Nov. 18, 1969  F. P. DELUCA, JR  3,478,883
ACOUSTIC FILTRATION APPARATUS
Filed April 13, 1967  4 Sheets-Sheet 1

Frank P. DeLuca, Jr.
Inventor
by Alfred H. Rosen
Attorney

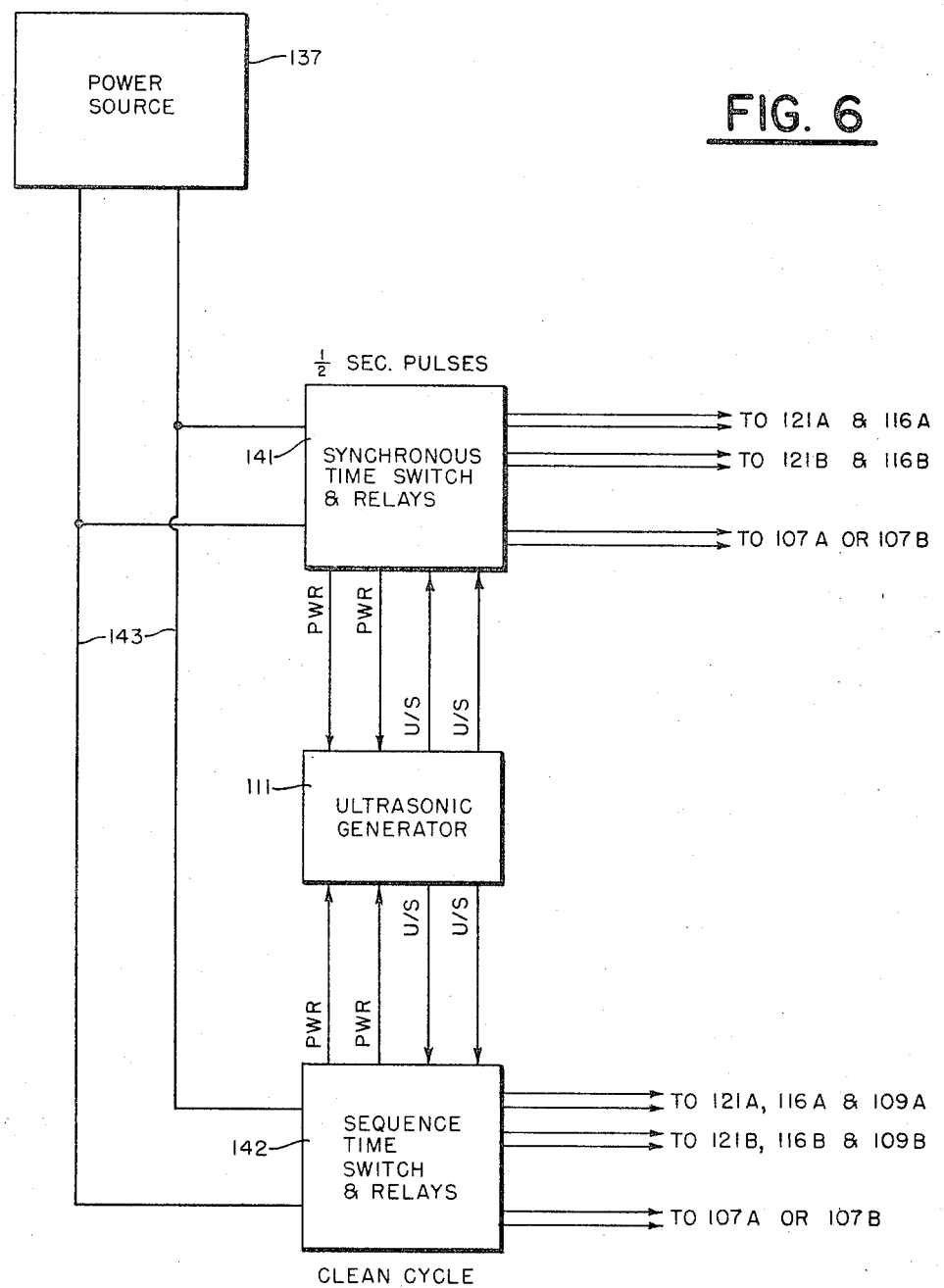

United States Patent Office 3,478,883
Patented Nov. 18, 1969

3,478,883
ACOUSTIC FILTRATION APPARATUS
Frank P. Deluca, Jr., Encino, Calif., assignor to Amsalco, Inc., Los Angeles, Calif., a corporation of California
Filed Apr. 13, 1967, Ser. No. 630,738
Int. Cl. B01d 41/00
U.S. Cl. 210—108        6 Claims

ABSTRACT OF THE DISCLOSURE

A flow-line liquid filter system is disclosed having means for increasing the soil retention capability and cleaning accumulated solids off the filter element with the aid of elastic wave irradiation applied to the liquid in the filter chamber. Electromechanical transducers are actuated, intermittently, continuously, in the drain cycle or on back-flush only, or in combination of these steps, to clean solids of the filter and aid in their collection subsequently. An electrically-operated control system sets either the irradiation and/or the back-flush system into operation when the back-pressure at the input of the filter system indicates a clogged or nearly clogged filter.

BACKGROUND OF THE INVENTION

The present invention relates to flow-line filtration systems for removing suspended solid matter from liquids, in which filter means having solid members spaced apart to provide filter passages is located in the flow path of the liquid. According to the invention, means to engender elastic wave energy of a type which will propogate through a liquid, and at an intensity level sufficient to do work at an interface between the liquid and a solid, are located adjacent to said path remote from said filter means to engender such elastic waves in liquid flowing in the path, so that the elastic wave energy can reach the solid members of the filter only through a liquid present in the flow path. Further in accordance with the invention, back-flush means may be provided to reverse-flush or otherwise clean the filter in the presence of the elastic wave energy, so that the filter can be cleaned and accumulated refuse removed from the flow path efficiently and in a short time.

Flow-line filtration systems for removing suspended solids from liquids are well known. The filter means may be made of any porous structure, such as closely-woven fiber or metal wire cloth of suitable mesh, fibrous bulk material, paper spools, sintered metals, spaced metallic discs, or any other structure consisting of solid elements spaced apart to provide passages which do not pass particles larger than a prescribed size.

Usually when a filter element of any type is inserted in a line carrying a liquid, it is so mounted that no by-pass paths are left open to reduce the efficiency of filtration. Therefore, a pressure drop occurs when the liquid passes through the filter, the initial magnitude of which is related mainly to the porosity of an uncontaminated filter element. Thereafter, the pressure drop rises as the filter element clogs up. Usually the filter element must be replaced or cleaned after the pressure drop becomes excessive and flow becomes severely hampered or, in an extreme case, is totally restricted. Otherwise, damage to equipment or other harm may be done. A common example is the porous filter in the lubricating oil system of an automobile gasoline engine. In many industrial applications, the need for removing a filter for replacement necessitates a costly plant shutdown while the filter element is removed from its containing housing and a new one is inserted. Varying quantities of valuable liquids also may be lost, and require replacement, while air or other contaminants may be introduced to the system to pose other problems.

A prior attempt to apply elastic wave energy to the cleaning of flow-line filters is published in Soviet Progress in Applied Ultrasonics, Vol. 2, Ultrasonics in the Chemical Industry, by V. A. Nosov, as translated by Consultants Bureau, New York, 1965. This publication describes on pages 47–48 a Model UZF–1 ultrasonic filter designed by the Chemical Machines Research Institute in Russia. In this device, a filtration element in the form of a rigid porous disc placed perpendicularly to the direction of liquid flow is mechanically vibrated by direct coupling to a magnetostrictive transducer connected to its center. The mechanical difficulties of vibrating the filter screen obviate most practical applications. A compliant woven wire type screen or other non-rigid filtration element cannot be vibrated in the manner described by this publication. In practice, the Russian development is limited to the use of rigid filtration elements, such as perforated metallic discs, whereas the present invention is compatible with conventional filtration elements, including pleated woven wire elements having far greater surface areas than that which can be achieved with a simple disc. No provisions are included in the Model UZF–1 system for back flushing or otherwise self cleaning the system when the filter element clogs up.

SUMMARY OF THE INVENTION

In accordance with the present invention, there is provided, in a flow-line filtration system for removing suspended solid matter from liquids comprising filter means having solid members spaced apart to provide filter passages located in the flow path of the liquid partitioning said flow path into an input part and an output part, input conduit means for introducing into said input part influent liquid containing suspended solids, and output conduit means for removing effluent liquid from said output part, the improvement comprising means to engender elastic wave energy of a type which will propagate through a liquid and at an intensity level sufficient to do work at an interface between the liquid and a solid, said means to engender being located adjacent to said path remote from said filter means to engender elastic waves in liquid flowing in said path whereby said elastic wave energy can reach said solid members only through a liquid present in said flow path.

Further, in accordance with the invention, there is provided a filtration system including pressure-sensitive means, which may, for example, be coupled to said input conduit means or between said input and output conduit means, for sensing an increase in pressure developed across said filter means due to accumulation of said suspended solid matter on or within the pores of said filter means, means to back-flush said filter means through said output conduit means, operator means for placing said back-flush means optionally in one or the other of an operative state and a stand-by state, means coupling said operator means to said pressure-sensing means for placing said back-flush means in said operative state when said pressure exceeds a prescribed value and for maintaining said back-flush means in said stand-by state when said pressure is at a value below said prescribed value, and drain conduit means for removing liquid and accumulated solid matter from said input part.

In accordance with another aspect of the invention there is provided, in a flow-line filtration system for removing suspended solid matter from liquids comprising filter means, and input and output conduit means to pass such liquids therethrough, the improvement comprising means to engender elastic wave energy of a type which will do work at an interface between the liquid and said filter, and means to apply said energy intermittently to said interface.

It is, therefore, an object of the invention to provide new methods and means to operate flow-line filtration systems for suspended solid matter from liquids. Particular objects include the provision of new methods and means to apply elastic wave energy to such systems, to provide novel back-flush sub-systems and programs for operating the same, and to extend the useful operating life of such flow-line filtration systems.

The invention provides elastic wave energy to a filter system in such a way as to cause the filter element to operate for longer periods of time without replacement and to offer a means for in-place cleaning. Filter systems equipped with the invention have operated for extended periods of time without maintenance requiring interruption of service, while others have proven beneficial in improving the recovery of solid materials transported by a liquid. Still others have lengthened the life of critical lubrication systems by eliminating loss of lubricant flow because of clogged filter elements.

The invention is described below in connection with certain specific exemplary embodiments of it. This description refers to the accompanying drawings, in which:

FIG. 2 illustrates another embodiment of the invention;

FIG. 6 illustrates a control system for the filter system of FIG. 5.

DESCRIPTION OF THE EMBODIMENTS OF THE INVENTION

Figure 1:
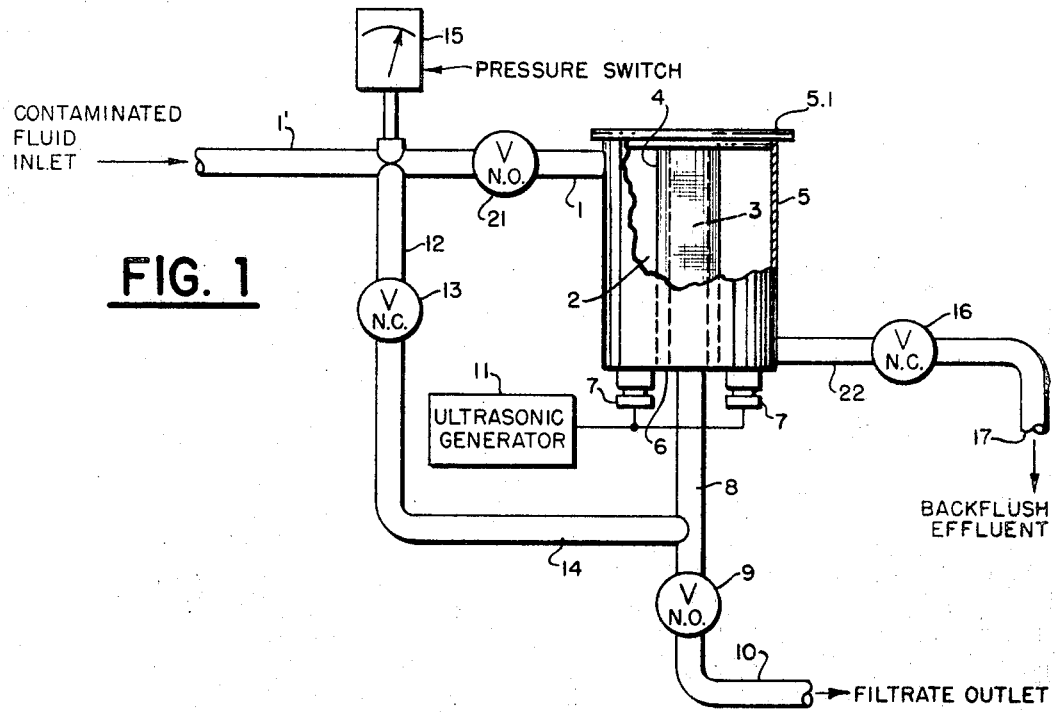
FIG. 1 illustrates an embodiment of the invention.

In FIG. 1 a filter housing 5, which may be a hollow cylindrical, rectangular or other shaped chamber fitted with a removable cover 5.1, has a hollow filter element 4 axially disposed in it and dividing its interior into an input part 2 for influent liquid, and output part 3 for effluent liquid. An input conduit 1 for contaminated fluid is fitted with a normally open valve 21, and a pressure switch 15 responsive to fluid pressure in the input conduit. The input conduit leads contaminated fluid into the input part 2 of chamber 5. An output conduit 8 leads filtered fluid from the output part 3 of the chamber 5 to the filtrate outlet 10. A normally open valve 9 is located in the output conduit 8. One or more electromechanical transducers 7 are attached to the bottom wall 6 of the chamber 5, using that wall as a diaphragm for the introduction of elastic wave energy into a fluid when present in the chamber 5. The transducers may be of any of several known forms as exemplified, for example, by U.S. Patents Nos. 2,947,889 and 3,101,419. Electromechanical transducers may be attached to the lower wall 6 according to U.S. Patent Nos. 2,956,789 or 2,995,347, for example. A driver in the form of an electric wave generator 11 is connected to the transducers. Details of sonic and ultrasonic electromechanical transducers, electric wave generators, and the employment of the combination thereof to irradiate liquid baths with elastic wave energy are well known, and, per se, form no part of the present invention.

A back flush input conduit is coupled at one end 12 to the contaminated fluid input conduit 1 and at the other end 14 to the filtered fluid output conduit 8 and has a normally closed valve 13 in it, between its ends. A back flush output conduit 22 is coupled to the first part 2 of the chamber 5 for removing back flush effluent at an output 17, and has a normally closed valve 16 in it.

In operation with normally open valves 21 and 9 in their respective normal positions and the normally closed valves 13 and 16 in their respective normal positions contaminated influent fluid passes through the input conduit 1 into the first part 2 of the chamber 5, through the filter element 4 into the second part 3. Suspended solid matter larger than a given size, for example, larger than 20 microns in size, does not pass through the filter element and is retained on the outer surface thereof confronting the first part 2 of the filter chamber. Filtered fluid containing only particles under 20 microns in size passes into the second part 3 and thence through the output conduit 8 to the filtrate outlet 10. Upon build up of the larger particles (not shown) on the filter surface of the filter element 4 pressure in the input line 1 rises. When this pressure reaches a predetermined level at which the filter element becomes operative only at an efficiency level below a predetermined level, the pressure switch 15 changes condition (as is described in detail in connection with FIG. 3), and causes the normally open valves 21 and 9 to be closed, and the normally closed valves 13 and 16 to be opened. The contaminated fluid entering the input conduit 1 is then diverted into the back flush conduit 12, 14, and enters the second part 3 of the filter chamber 5 via the output conduit 8, where it forces the accumulated solid material off the filter element 4 and into the first part 2 of the filter chamber, and thence out through the back flush output conduit 22 to the back flush effluent outlet 17. Upon appropriate drop in pressure in the input line 1, determined by a differential setting of the pressure switch 15 (examples of appropriate switches being well known in the art), the valves 9, 13, 16 and 21 are restored to their respective normal conditions and normal operation of the filter system is resumed. Appropriate pressure settings for the switch 15 are 150 lbs./sq. in. at the upper or back-flush level, and 5 lbs./sq. in. at the lower or restoring level.

The electromechanical transducers 7 may be employed continuously or intermittently, as desired. If employed intermittently, the ultrasonic generator 11 may be connected to a power source to be operated only when the system is being backflushed. In this mode of operation, useful when heavy clogging soil has built up on the filter element 4, the system will activate the ultrasonic transducers during a short backflashing cycle to effect an ultrasonic cleaning of the element itself in situ and a simultaneous ejection of collected sludge into a catch basin. Experience has shown, however, that several different cleaning programs are of benefit in securing the maximum possible soil retention within the filter housing as well as the most concentrated sludge and thereafter restoring the element 4 itself to a useful state of cleanliness. Thus, another mode of operation may be used between times requiring a back-flush cleaning operation. In such a mode, between times requiring a backflush operation (i.e: a "primary" cleaning cycle), it has been found that intermittent applications of ultrasonic energy in periodic pulses can lengthen the time span between the primary cleaning cycles, or synonymously, increase the soil holding capacity of the complete filter.

In the case of a 5 gpm unit according to FIG. 1, laboratory tests have been accomplished with a standard contaminant, "AC dust," using a 10 micron filter element of the sintered stainless steel type. This filter element measuring 10 in. high and 2¾ in. in diameter, or 0.6 sq. ft. in. area, has a soil holding capacity by itself without elastic wave irradiation, of 5 grams after which flow is severely restricted and cleaning is required. It has been observed that by pulsing the ultrasonic generator to provide in the liquid in the chamber 5 pulses of elastic wave energy ⅓ second once each minute during normal operation of the filter system, the soil holding capacity of the filter element is increased substantially. It appears that his additional soil is held in a cloud surrounding the filter element until the density of the cloud plus the layering of soil on the face of the filter element can no longer be tolerated in terms of pressure buildup and reduced fluid flow. This cloud is found to be beneficial in acting as an auxiliary filtration system enhancing the overall performance of the system unit.

Once the filter element 4 clogs up at a soil holding capacity many times that possible to achieve without the elastic wave irradiation, onset of the primary cleaning cycle is signalled upon command of the pressure sensor 15. This primary operation first involves stopping flow and retaining influent liquid within the filter element housing 5, for example, one minute during which time various surface soils on the filter element 4 are either agglomerated or disintegrated as the case may be by continuous application of elastic wave energy. Immediately thereafter, a repetitive backflush or drain operation is started, each cycle of which, in the present example, lasts for 5 seconds. After a ten second pause, another backflush takes place until five complete backflush operations have been completed, as an example. During backflush, the soils are exhausted through the separate line 22, 17 where they are collected (not shown) in a highly concentrated sludge for further disposal. An entire cleaning operation according to this example consumes only 2½ gallons of clean water for backflushing compared to the approximate 2 gallon holding capacity of the filter element housing 5. It will be understood that substantial reductions, even in this small requirement, are possible by design sophistication. Similarly, the time for accomplishing effective cleaning can also be reduced from the time interval mentioned in this example.

It has been found that filter systems equipped with sonic or ultrasonic irradiating devices, as exemplified by the embodiment of FIG. 1, can be operated for extended periods of time without maintenance, and that they remove the necessity for such extended periods of time opening the filter chamber and changing the filter element. In applications of filter systems where the clogging of a filter can damage a machine or assembly of machines, this has provided a significant safety feature and has lengthened the life, for example of critical lubrication systems by eliminating the risk of loss of lubricant flow because of clogged filter elements. In many industrial applications the need for removing a filter for replacement necessitates a costly plant shut down while the filter element is removed from the filter chamber and a new one is inserted. Each time the filter chamber is open for this purpose some of the liquid being filtered, which may be a valuable lubricant, can be lost, while air or other contaminates may be introduced into the system, thus posing still additional problems. The present invention obviously reduces these risks and in some cases eliminates them entirely.

The frequency of the transducers 7 is not of particular consequence, and may be in the infrasonic, audible, or the ultrasonic range (above 18,000 cycles per second). The use of ultrasonic frequencies has the well known desirable effect of eliminating noise, and permitting the use of physically small transducers, but the invention is not limited to that choice. Moreover, the transducers can be mounted on an external wall of the chamber 5, as shown, or within the chamber 5, as desired, as long as the elastic wave energy is introduced into the fluid present in the chamber, and can reach the filter element only through that fluid. In this manner it is possible to use a filter which is rigid or flexible as desired, and all that is necessary to the operation of the invention is to provide an interface between the fluid in the chamber and the solid material of the filter element.

Depending upon the intensity of the elastic wave energy in the fluid in the filter chamber, and the intensity of energy at the interface between the filter element 4 and that fluid, an improvement in filtration takes place which is proportional to the magnitude of the elastic wave energy within certain boundary levels. The intensity level of irradiation may be so established that cavitation occurs either in the body of liquid or at the interface between the liquid and solid, or both. Below a cavitation threshold, a slight improvement in filter performance is observed in terms of a reduced pressure drop measurable in the input conduit 1. As the intensity of the elastic wave energy is increased up to and beyond the cavitation threshold, the performance of the invention increases rapidly. In the cavitation region several different mechanisms appear to occur, and to combine to enhance the filtration. For one, the generation of energy at a cavitation level, with its inherent alternating formation and collapse of imploding and exploding cavitation bubbles, tends to clean the surface of the filter element and to remove gas from the interface between the filter element and the fluid, thereby simultanously increasing the efficiency of the elastic wave radiation process and cleaning the surface of the filter at the same time. Furthermore, solid particles are literally torn off the surfaces of the filter element, and tend to agglomerate, until by virtue of their increasing mass they fall and collect at the bottom of the input portion 2 of the filter chamber, where they are most easily removed by the back flush system. Some particles can be dispersed into the smaller sizes which can pass through the filter, being then harmless to the system containing the fluid being filtered. At the same time, oils in the liquid can be emulsified, becoming harmless. The combined effects of all these beneficial acoustical phenomena is a substantial reduction of the pressure drop through the filter system even when it is new and when passing pure (i.e.: uncontaminated) liquid. This result, taken together with the extension of the period of time required for the back pressure in the input conduit to build up to an undesirable level, further combines radially to increase the efficiency of in-flow filter systems. One beneficial consequence is that a smaller filter chamber and filter element can be used than heretofore, for a given application.

In a practical embodiment built substantially according to FIG. 1, approximately 250 watts of ultrasonic frequency electric energy was applied to an array of electromechanical transducers 7 affixed to the underside of the filter housing 5. This produced elastic wave energy at a cavitation level in the liquid within the housing. This cavitation process accomplished a number of desirable functions which, in concert, restored the cleanliness of the filter element 4 to a "like new" condition. The immediate action was the shearing effect of the cavitation, which breaks the bond interface holding soil to the surfaces and pores of the filter, a cleaning action which is believed to be substantially impossible to accomplish by any other technique. In addition, soils thus dislodged formed a dense cloud surrounding the filter element 4 without impairing its filter performance. This cloud acted as a filter, which further enhanced the performance of the system.

Another beneficial effect of the present invention is that it brings with it the anti-bacterial effects of the application of elastic wave energy to liquid baths, both above and below the cavitation level, as a particular case may dictate. As is well known, this effect involves the killing of liquid-borne bacteria either by the explosive effects of cavitation energy, or by exciting bacteria molecules into their natural modes of mechanical vibration, or both, simultaneously. As is further well known, certain forms of bacteria can be killed selectively by varying the frequency of the applied acoustic energy, and it is within the scope of the invention to operate ultrasonic transducers 7 at one or several frequencies as desired, with this purpose in mind.

Referring to FIG. 2, in which parts which are the same as in FIG. 1 bear similar reference characters primed, the back flush conduit 12', 14' has its input end disconnected from the input conduit 1' and arranged for the introduction of a separate flushing fluid at a flushing fluid input 12.1. In some applications it will be undesirable to use the contaminated fluid as a flushing fluid, because this will result in depositing some of the contaminant on the effluent side of the filter 4' confronting the second part 3' of the filter chamber 5'. In that event, upon resumption of normal operation, this contaminant, even though it may be small in quantity, is discharged into the filter fluid outlet conduit 8'. By using a separate flushing fluid introduced at input 12.1 this contingency is eliminated.

FIG. 2 illustrates a number of additional features which may be employed in practicing the invention. The input conduit 1' is coupled to the chamber 5' at the lower portion of a side wall near the bottom 6'. Preferably, the input conduit is disposed at an angle such that the contaminated fluid is introduced in a direction tangential to the side wall, in a direction such that the Coriolis force will facilitate a circular flow (indicated by the arrow 25) about the axis of the chamber 5'. This flow tends to put the heavier particles carried by the contaminated fluid in the center of the chamber, where the output conduit 8' is located. The filter element 4' can be given a shape such that it is wider at the top than at the bottom, to facilitate the dropping off of adhering particles during backflush.

A vent and overflow conduit 22.1 fitted with a normally-closed valve 23 is coupled to the chamber 5' near its top. During back-flush this valve 23 is opened to admit air so the chamber can be drained rapidly before back-flush fluid is introduced, as well as to permit rapid entry of the back-flush fluid. Any overflow of incoming back-flush fluid can be drained away, or caught in a pan 24, or it can be fed back to the source (not shown) of the contaminated fluid.

Figure 3:
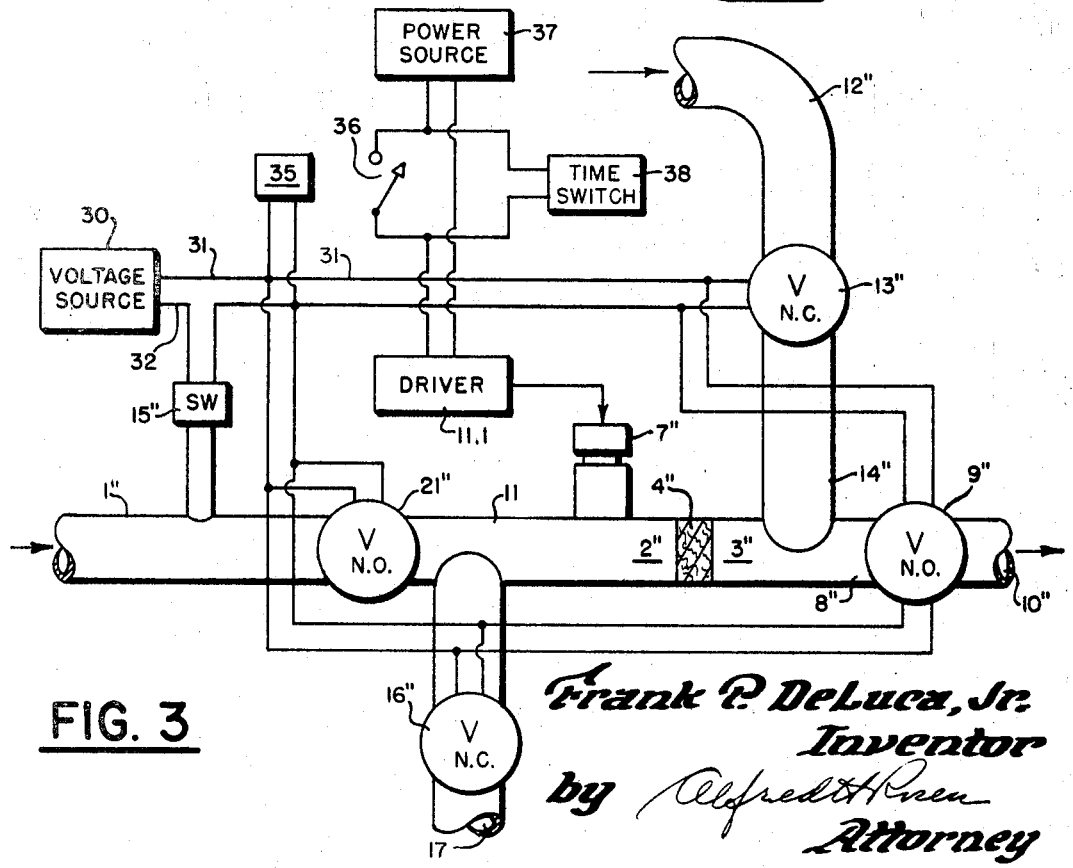
FIG. 3 is a simplified schematic illustrating the general principle of the invention and showing an electrical control system.

FIG. 3 is a schematic diagram which is identical in all generic respects to FIGS. 1 and 2, and is included to show an example of electrical circuit means to control the filtration system for normal operation, including intermittent application of elastic wave energy, and for back flush operation. Parts which are essentially in common with FIGS. 1 and 2 bear like reference characters, double primed. A voltage source 30 provides operating voltage over control lines 31 and 32, the second of which passes through the pressure-responsive switch 15", which functions as a single-pole, single-throw switch. In the normal operating condition, when the pressure is below 150 lbs. per square inch, for example, switch 15" is open. When the pressure in the input line 1" reaches 150 lbs. per square inch, the switch 15" closes and the output voltage of the voltage source 30 appears in lines 31 and 32 throughout the system. When switch 15" is closed a relay 35 is energized, closing a normally-open switch 36, applying energy from a power source 37 to the driver 11.1 for the transducers 7", so that the driver 11.1 is rendered operative (the driver 11.1 generically represents the ultrasonic generator 11 in FIG. 1). At the same time the normally open valves 9" and 21" are closed and the normally closed valves 13" and 16" are opened. When the pressure in the influent part 2" of the chamber 5" drops to 5 lbs. per square inch, the switch 15" opens, the driver is turned off, and all the valves are returned to their respective normal conditions. For intermittent operation of the transducer(s) 7", a time switch 38, in shunt with the normally-open relay switch 36, applies power to the driver 11.1, without however, affecting the conditions of the valves 9, 13, 16 and 21.

Figure 4:
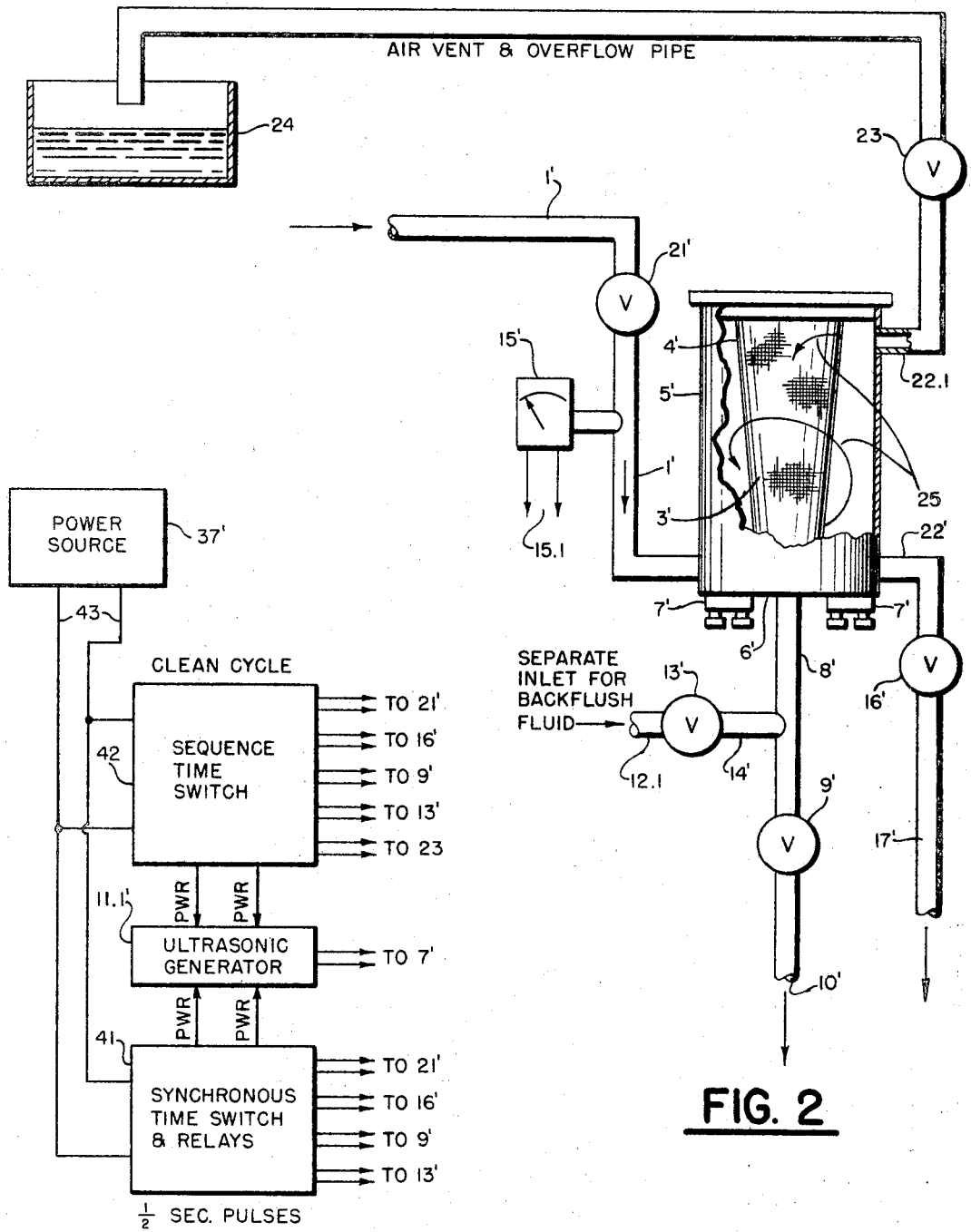
FIG. 4 is a schematic illustration of an exemplary cleaning cycle program control system.

It will be understood that the circuit arrangements shown in FIG. 3 are exemplary only. Thus, a program which is operable is to use the time switch 38 to energize the driver ⅓ second every minute and simultaneously to operate the backflush system to flush out soil collected on the bottom 6 of the chamber 5. In some cases, a program of several (e.g.: 5) backflush cycles in succession is found to be useful. FIG. 4 illustrates one example of a useful "clean cycle" program. FIG. 4 should be read in connection with FIG. 2.

A source of power 37' (corresponding to the power source 37 in FIG. 3) provides operating energy for an arrangement of synchronous time switch and relays, represented by a block 41, and a sequence time switch, represented by a block 42, over power lines 43, 43. The synchronous time switch in block 41 operates the ultrasonic generator 11.1', and through it the transducers 7', for one-half second every 15 seconds; this switch is labelled "½ SEC PULSES," to indicate this function. Through relays in block 41, this switch also closes valves 21' and 9', and opens valves 16' and 13' for the same one-half second interval every 15 seconds. Thus there is produced a regular sequence of one-half second back-flushing "pulses" in the filter system.

The sequence time switch (block 42) operates the ultrasonic generator 11.1' and transducers 7' for a variable, but predeterminable, cleaning cycle. This cycle can be initiated cyclically, or under control of the pressure-responsive switch 15', as is illustrated in FIG. 3. In this cycle, valves 21' and 9' are closed, and valves 16', 13' and 23 are opened according to one of several possible sub-routines, for example:

(a) valves 13' and 16' opened on a variable but predetermined backflushing cycle with transducers 7' operating; or (b) valves 16' and 23 opened for rapid drain of the chamber 5', followed by opening valves 13' and 23 for rapid refiill, then followed by back-flush with valve 16' open, with transducers 7' operating.

The particular application of the present invention in a given case depends upon the installation in which the filter system is employed. One of two typical classes of applications involves the filtration of constantly circulating fluids, such as the lubricating oil in a diesel engine. In this type of system, the simplest method of cleaning the filter is to periodically energize the elastic wave transducers at the same time soils removed from the element are directed into a collecting sump. Ultimately, this type of system can be used with a soiled liquid which will become cleaner as time passes, assuming, of course, that the rate of new contamination is less than the rate of soil removal. In this mode of operation, the ultrasonic energy usually pulses on for short periods of time more frequently when the liquid is contaminated than thereafter as the liquid is cleaned.

A second class of applications involve continuous flows, such as those encountered in breweries, oil refineries, water supplies and the like. Depending upon the dirt holding capacity of the filter element itself, and the larger holding capacity of a sonic or ultrasonic filter system supplied with electromechanical transducers in accordance with the present invention, as well as the magnitude of flow contamination, it is possible to clean the filter element either during forward-flow as described above, or by elastic wave irradiation during "back flush," or by both. In combination with irradiation with elastic wave energy, back flushing is most effective. Using the present invention, it frequently is possible to back flush with the same liquid being filtered, especially in the case of a constantly circulating liquid.

Figure 5:
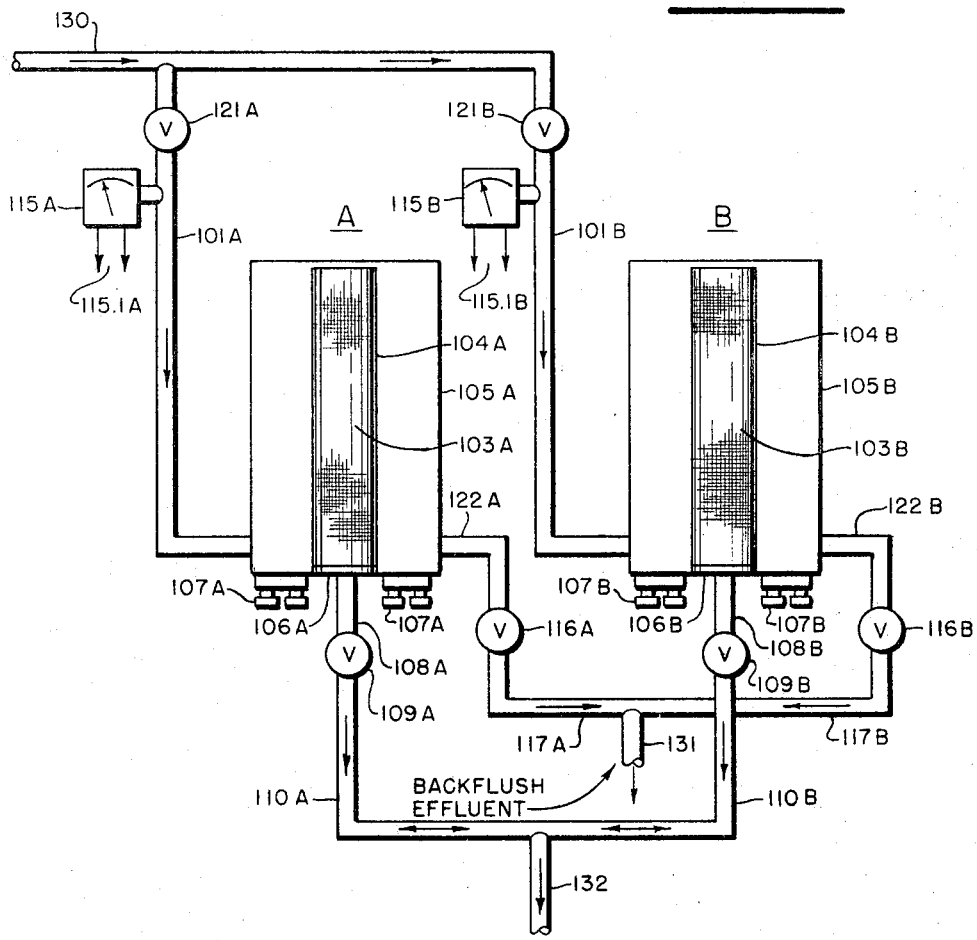
FIG. 5 illustrates a filter system empolying two filter chambers.

FIG. 5 illustrates a filter system employing two filter chambers in an arrangement which permits the use of filtered liquid from one chamber to back-flush the other chamber, and FIG. 6 illustrates a control system for the filter system of FIG. 5. FIG. 5 is comprised, basically, of two individual subsystems "A" and "B," each like FIG. 1 or FIG. 2, coupled in parallel. Parts in common with FIGS. 1 and 2 bear similar reference characters in the 100-series. Thus, for example, in subsystem A the input conduit is labelled 101A, while in subsystem B the input conduit is labelled 101B. An input conduit 130 for contaminated fluid is coupled in parallel to the subsystem input conduits 101A and 101B through their respective normally-open valves 121A and 121B. The subsystem filtrate outlets 110A and 110B are coupled in parallel to a system filtrate outlet 132. The subsystem back-flush effluent outputs 117A and 117B may, as a convenience, be coupled in parallel to a common backflush effluent output 131. The subsystem filter housings 105A and 105B are shown only schematically, but it will be understood that they may incorporate features of FIG. 1 or FIG. 2. Likewise, the filter elements 104A and 104B are shown only schematically. The subsystems are not fitted with back-flush input conduits corresponding to conduit 12–14 in FIG. 1 or to 12.1', 14' in FIG. 2, since the system of FIG. 5 is designed to allow the clean filtrate from one of its subsystems to be used as the back-flush fluid for the other of its subsystems.

FIG. 6 illustrates, in block-diagram form, a system for performing one or more exemplary cleaning cycles in the filter system of FIG. 5. A power source 137 supplies power over lines 143 in parallel to a block 141 containing a synchronous time switch and relays, and a clean cycle block 142 containing a sequence time switch and relays. The ultrasonic generator 111 receives power from the block 141 or 142 which operates it, and supplies elastic wave energy, over lines labelled "U/S," to that block for distribution to the subsystem transducers 107A or 107B.

The synchronous time switch in block 141 operates the ultrasonic generator 111, and the transducers 107A or 107B of a selected one of the subsystems A or B. This operation, in the present example, is the same as in FIG. 4, except that the subsystem so selected is pulse-operated to function as a filter while the other subsystem is being cleaned, or is idle. The relays in this block 141 are programmed to open the normally-closed back-flush outlet valve 116B of subsystem B and close its normally-open contaminant input valve 121B while subsystem A is being acoustically pulsed and operated as a filter. Then, the output from subsystem A will be partly diverted through subsystem B filtrate valve 109B (which is normally open) to function as a cleaning fluid for subsystem B. Bearing in mind that the system of FIG. 5 will be operated under positive pressure at the system input conduit 130, and that the clean filtrate at the system outlet 132 will also be under a lower, but still positive, pressure, and moreover that the back-flush outlet valve 116A of subsystem A is in its normally-closed condition, it will be apparent that this valve program allows subsystem A filtrate to function as subsystem B flushing fluid. The reverse program, in which subsystem B is operated as a filter and acoustically pulsed while subsystem A is shut down or cleaned by filtrate from subsystem B, is readily apparent from the foregoing discussion. It is also apparent, from the foregoing discussion, that in cases where one subsystem is being cleaned by filtrate from the other, the elastic wave (acoustic) energy can be applied exclusively to the subsystem that is being cleaned, or to both subsystems simultaneously or alternatively, for example.

The sequence time switch (block 142) functions also in the same general manner as the corresponding parts in FIG. 4, and it will be appreciated that the system of FIG. 5 can be fitted with controllable exhausts to the atmosphere, like vent 22.1 and valve 23, in FIG. 2, if desired, which can be incorporated in a control program of draining and flushing either of the subsystem A and B, as desired. Operation of the sequence time switch can be initiated by a predetermined time cycle setting, or by the pressure switches 115A, 115B, alternatively or together. Assuming a program confined to alternative operation, operation of the pressure switch of one subsystem (A, for example) can be programmed merely to close the contaminant input valve 121A and open the back-flush outlet valve 116A of that subsystem, whereupon subsystem A will be back flushed by clean filtrate from subsystem B. The transducer 107A of subsystem A can be shut down or not, as desired, depending upon the material being filtered and other operating conditions.

As will now be apparent, a dual-filter system as shown in FIG. 5 can be back-flushed by alternating from one subsystem to the other. Depending on the operating requirements of the system, this arrangement may not provide a continuously-operable filter system, due to the fact that the subsystem being cleaned is not on the line (contaminant input valve 121A or 121B closed) and the flow from the other subsystem is being used, at least in part, for the back flush fluid. Even though back-flushing of a subsystem might occur only several minutes out of an hour or more, the system might be deficient in required continuity of operation. The provision of three or more subsystems in a system otherwise similar to that shown in FIG. 5 would provide a system in which one subsystem is used to backflush any other subsystem, while the third subsystem maintains the filter-flow. In the case of three subsystems, there would be at least one-third normal flow rate during backflush. If, on the other hand, one were to use a system comprised of twenty-four subsystems, requiring a backflush of any one subsystem once per hour, the flow rate of the system during backflush of one subsystem, without considering the reduced flow due to the dirt on any of the filter elements, would be approximately 96% of the total system flow capacity. Additional subsystems can be added in parallel, according to FIG. 5, to any number desired.

A filter system comprising several subsystems in parallel, according to the concepts of FIG. 5, provides a highly efficient system with advantages of economy of operation and construction. Thus, for example, in such a system, which uses its elastic wave transducers and driving generator only during back-flush, 12 single filter subsystems can be cleaned by one common 250 watt generator with each subsystem sharing a five minute switched duty cycle from the generator. Obviously then the generator for a 12 subsystem-system, with a five minute duty, cycle would be on continuously. From a practical standpoint, one might include a second backup generator, to share the duty cycles and increase the total system reliability. By contrast, 12 filter elements of the same length side by side in a larger chamber would require 2,000–3,000 watts of driving generator power to do the same job as the 250 watt generator in this separate chamber system. Accordingly the individual subsystem technique, with a switched driving generator and a short duty cycle which is illustrated in FIG. 5 can be expanded to larger systems, with many attendant advantages.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

I claim:

1. In a flow-line filtration system for removing suspended solid matter from a liquid comprising filter means located in the flow path of the liquid in a filter housing, said filter means partitioning said housing into an input part and an output part, input conduit means for introducing into said input part liquid containing suspended solids, and output conduit means for removing filtered liquid from said output part, the improvement comprising means to engender elastic wave energy of a type which will propagate through a liquid and at an intensity level sufficient to cause cavitation of the liquid and to do work at an interface between the liquid and said filter means, said elastic wave means being located remote from said filter means so that elastic waves engendered thereby in liquid flowing in said path can reach said filter means only through such liquid, sensor means to detect a rise in fluid pressure in said input conduit means, backflush means for said housing, arranged to be put into operation with interruption of filtration when said rise in pressure exceeds a preset amount, driver means for said elastic wave means and means responsive to said sensor means to operate said driver means to engender said elastic wave energy intermittently, whereby to apply said wave energy to said interface in a series of elastic wave energy pulses.

2. A system according to claim 1 in which said means to operate said driver means operates to engender said elastic wave energy intermittently during continuous filtration.

3. A system according to claim 1 in which said means to operate said driver means operates to engender said elastic wave energy intermittently during operation of said back-flush means.

4. In a flow-filtration system for removing suspended solid matter from liquids comprising filter means in a filter housing, and input and output conduit means to pass such liquids through said housing, the improvement comprising means to engender elastic wave energy in said housing, means to apply said energy intermittently in periodic pulses to do work at an interface between liquid in said housing and said filter means, means to back-flush said filter means through said output conduit means, operator means for placing said back-flush means optionally in one or the other of an operative state and a stand-by state, means coupled to said operator means for placing said back-flush means in said operative state when desired and for maintaining said back-flush means in said stand-by state when desired, drain conduit means coupled to said housing for removing liquid and accumulated solid matter from said housing when said back-flush means is in said operative, normally-closed first valve means in said drain conduit means, normally-open second valve means in said input conduit means, said operator means being coupled to each of said valve means to open said first valve means and close said second valve means to place said back-flush means in said operative state, and to permit said valve means to return to their respective normal states to place said back-flush means in said standy-by state.

5. A flow-line filtration system comprising a plurality of subsystems each being a system according to claim 4, the input conduit means of each of said subsystems being connected in parallel to a common source of liquid for filtration, the output conduit means of each of said subsystems being connected in parallel to a common output conduit, and backflush control means to divert at least a part of the output filtrate of one of said subsystems into the output conduit means of another of said subsystems, for backflushing said other subsystem.

6. A system according to claim 5 including individual electroacoustic transducer means for each of said subsystems to engender elastic wave energy therefor, a common source of driving electrical energy for the electroacoustic transducer means of said system, and means operative in concert with said control means to couple said source to the transducer means of each subsystem exclusively during drain or backflush thereof.

References Cited

UNITED STATES PATENTS

| | | | |
|---|---|---|---|
| 2,392,666 | 1/1946 | Harris | 210—388 |
| 2,569,748 | 10/1951 | De Grave | 210—108 |
| 2,742,158 | 4/1956 | Schelled | 210—152 |
| 2,769,506 | 11/1956 | Abboud | 55—292 |
| 2,982,412 | 5/1961 | Hirs | 210—108 |
| 3,002,915 | 10/1961 | Royded | 210—388 X |
| 3,161,591 | 12/1964 | Petter et al. | 210—407 X |
| 3,276,593 | 10/1966 | Katrkhouskr | 210—333 |
| 3,284,991 | 11/1966 | Ploeger et al. | 55—15 |

FOREIGN PATENTS 555,324   8/1943   Great Britain.

REUBEN FRIEDMAN, Primary Examiner

J. ADEE, Assistant Examiner

U.S. Cl. X.R.

210—333, 388